Patented July 11, 1950

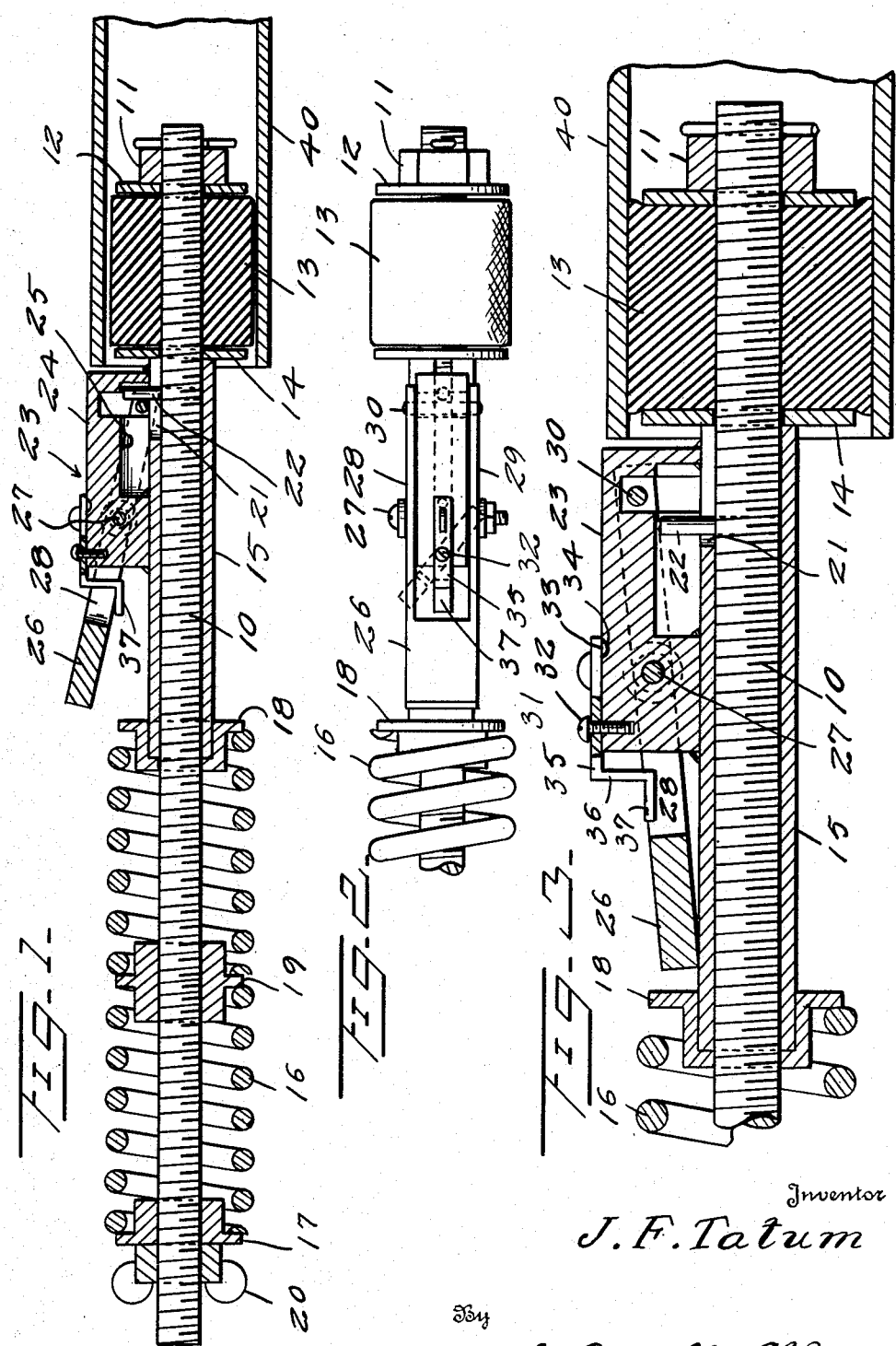

2,514,911

UNITED STATES PATENT OFFICE 2,514,911

SAFETY PLUG

Joseph Franklin Tatum, Hattiesburg, Miss.

Application July 27, 1948, Serial No. 40,970

2 Claims. (Cl. 138—89)

This invention relates to stoppers or plugs and more particularly expansible plugs for use in gas mains or water pipes where it is desired to shut off the fluid flow when connection is being made to a new section of piping.

Heretofore, it has been the practice to use an expansible stopper mounted on a threaded rod with screw means for expanding the diameter of the stopper after it has been placed in the desired location in the pipe. It is an object of this invention to provide a plug which can be expanded instantaneously once it is placed in the pipe.

It is a further object of this invention to provide an expansible stopper in which the compression of a coil spring effects the expansion of the stopper, and which is provided with screw means for compressing the spring and trigger means for relieving the stopper of compression of spring until the device is positioned in the desired point in the pipe.

A further object of this invention is to provide a safety lock for the releasing trigger for the purpose of preventing the release of the trigger before the expansible plug is located in the desired position.

Still another object of this invention is to provide an instantaneously expandable stopper which is simple to use and inexpensive to manufacture, with a minimum number of moving parts.

With the above and other objects in view, my invention consists in the arrangement, combination and details of construction disclosed in the drawings and specification, and then more particularly defined in the appended claims.

In the drawing:

Figure 1 is a side elevation in section, of the expansible stopper in contracted condition positioned inside a pipe, Figure 2 is a partial plan view of the expansible stopper shown in Figure 1, Figure 3 is an enlarged partial sectional side elevation of the stopper in expanded condition.

Referring to the drawing the numeral 10 designates generally a threaded rod having a nut 11 carried on one end thereof. Mounted on the rod adjacent the nut 11 is a washer 12. A rubber expansible plug or stopper 13 is slidably carried on the threaded rod 10 adjacent to the washer 12. A second washer 14 abuts the other end of the plug or stopper 13.

A tubular member 15 is slidably mounted on the threaded rod 10 and is adapted to abut the washer 14 for moving it to the right for the purpose of compressing the expansible plug 13 between the washers 12 and 14. Arranged about the rod 10 is a coil spring 16 seating upon the hat-shaped spring seats 17 and 18. Intermediate the length of the spring 16 a spacer 19 is slidably mounted on the rod 10 for the purpose of obtaining a uniform compression of the spring 16.

At the far end of the rod 10 from the nut 11, a wing nut 20 is threadably engaged with the rod 10. The tubular member 15 is formed with a slot 21 for engagement about the upstanding pin 22 which is fixedly carried by the rod 10. Mounted on top of the tubular member 15 is a trigger generally designated by the numeral 23. The trigger 23 consists of a housing 24 having a cut-out 25 extending along the bottom thereof for the purpose of accommodating the upstanding pin 22 carried by the rod 10.

A latch member 26 is rockably mounted on the housing 24 by the pivot 27. The latch 26 is formed with two split arms 28 and 29 respectively, having a cross pin 30 fixedly mounted therein. A safety lock 31 is provided for the purpose of retaining the latching member 26 in its latching position. The safety lock consists of a bar 35 pivoted from the top of the housing 24 by the screw 32 and having an indent 33 adapted to engage a depression 34 in the top surface of the housing 24. The pivoted bar 35 is formed with a right angled downwardly extending arm 36 having a horizontal portion 37 on the end thereof adapted to engage the arm 28 of the latching member 26.

Operation

When it is desired to shut off the flow of a fluid in the pipe 40, the latching member 26 is raised depressing the keeper pin 30 which then prevents movement of the pin 22 and the rod 10 in which it is fixedly mounted relative to the tubular member 15. The wing nut 20 is then rotated relative to the rod 10 compressing the spring 16. The expansible stopper is then inserted in the pin 40 and the latching member 26 is depressed, freeing the pin 22 and allowing the spring 16 to force the hat-shaped spring seat 18 towards the right and the spring seat 17 towards the left, as viewed in Figure 1.

This will cause motion of the tubular member 15 relative to the rod 10. The tubular member 15 will bear on the washer 14 and the nut 11 will bear on the washer 12, thereby compressing the expansible plug or stopper and increasing its diameter and thereby shutting off the flow of fluid in the pipe 40.

In order to insure against the accidental tripping of the latching member 26, the safety lock 31 is pivoted horizontally so as to engage the horizontal portion 37 under the arm 28 on the latching member. When the expansible plug is in position the safety lock is centered and the latching member 26 depressed for the purpose of expanding the plug, as explained above.

The details disclosed herein represent a preferred embodiment of my invention. However, I do not mean to be limited to these exact details but claim all variations covered by the appended claims.

What I claim is:

1. An improved expansion plug for use in fluid carrying pipes comprising an elongated rod having abutments on the opposite ends thereof, an expansible stopper on said rod and disposed against one of said abutments, a sleeve slidable on said rod and engageable with said stopper, spring means interposed between the other of said abutments and said sleeve for urging the latter against said stopper, a longitudinal slot formed in said sleeve, a pin fixed on said rod and loosely extending through said slot and a lever rockably mounted on said sleeve having a portion engaging said pin in one position for preventing longitudinal movement of said sleeve relative to said rod.

2. An improved expansion plug for use in fluid carrying pipes comprising an elongated rod having abutments on the opposite ends thereof, a cylindrical expansible stopper carried by said rod and disposed against one of said abutments, a pin fixed to said rod and extending radially therefrom, a tubular member slidable on said rod engaging said stopper and formed with a longitudinal slot loosely receiving said pin, a trigger on said tubular member including a housing fixed to said tubular member and overlying slot, a lever rockably mounted upon said housing and having a cross pin at one end thereof engaging said first mentioned pin when the other end of said lever is raised for preventing longitudinal movement of said tubular member relative to said rod, and a locking bar pivoted on said housing and in one position engaging under said other end of said lever for retaining said other end in raised position, and a compression spring interposed between said other abutment and said tubular member for constantly urging the latter against said stopper whereby said stopper will be longitudinally compressed for expanding the diameter thereof when said lever is rocked to disengage said cross pin from said pin on said rod.

JOSEPH FRANKLIN TATUM.

REFERENCES CITED

The following references are of record in the file of this patent:

UNITED STATES PATENTS

| Number | Name | Date |
|---|---|---|
| 1,117,669 | Hall | Nov. 17, 1914 |
| 1,121,847 | Kirkwood | Dec. 22, 1944 |
| 2,390,461 | Racy | Dec. 4, 1945 |
| 2,460,352 | Jensen | Feb. 1, 1949 |

FOREIGN PATENTS

| Number | Country | Date |
|---|---|---|
| 373,944 | Great Britain | Jan. 2, 1932 |